Oct. 25, 1955    C. W. STEELE    2,721,421
NOISE MAKING ATTACHMENT FOR BICYCLES
Filed Sept. 2, 1954
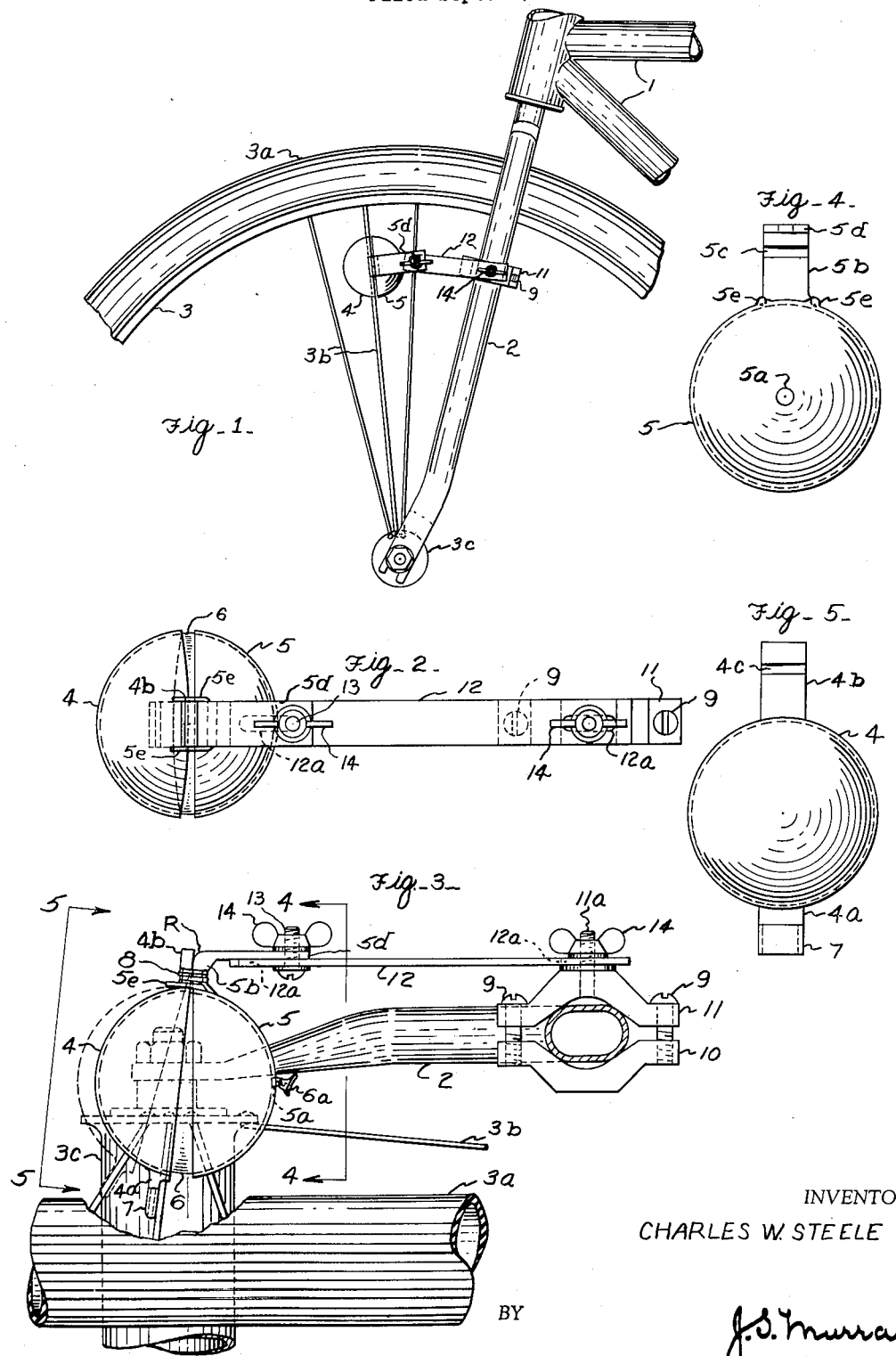
INVENTOR
CHARLES W. STEELE
BY
J. S. Murray
ATTORNEY United States Patent Office 2,721,421
Patented Oct. 25, 1955

2,721,421

NOISE MAKING ATTACHMENT FOR BICYCLES

Charles W. Steele, Detroit, Mich.

Application September 2, 1954, Serial No. 453,722

6 Claims. (Cl. 46—175)

This invention relates to noise making attachments for motorless vehicles having spoke wheels, such as bicycles and tricycles, and particularly to motor-noise simulating attachments for such vehicles.

An object of the invention is to create a noise simulating that of a motor by providing a pair of opposed complementary dished shells, jointly forming a receiver for an inflated air bag, one of such shells being pivotally actuated by the wheel spokes to alternately withdraw from and impact said bag.

An object is to rigidly mount one of such shells upon an adjustable bracket attached to the vehicle frame, and to provide a fulcrum on said shell for the pivotal shell.

Another object is to mount the other shell pivotally on said fulcrum, with means yieldably urging said shells together to substantially enclose the air bag while maintaining their opposed relation.

Another object is to form said pivotal shell with a finger to be engaged and released by the wheel spokes, thus urging said shell away from the air bag and allowing it to be snapped back to its initial position by said yieldable mounting means to create the desired sound.

Another object is to form the end portion of said actuating finger of a cushioning material to absorb the noise of its contact with the wheel spokes.

These and other objects are attained by the construction hereinafter described and illustrated in the accompanying drawing, wherein:

Fig. 1 is a fragmentary side elevational view of a bicycle frame with my invention mounted on the wheel fork thereof.

Fig. 2 is a side view of my device and its mounting bracket.

Fig. 3 is a top plan view of my invention in solid lines, with dash lines illustrating the position of the movable shell just prior to its disengagement from a wheel spoke.

Fig. 4 is a view of the stationary shell taken in the direction 4—4 of Fig. 3.

Fig. 5 is a view of the movable shell taken in the direction 5—5 of Fig. 3.

In the drawing, the reference character 1 designates the front portion of a bicycle frame, mounted on a wheel fork 2 which receives the wheel 3 mounting a tire 3a and having spokes 3b and a hub 3c. Mounted on said fork for actuation by said wheel is my motor-noise simulating attachment.

My invention comprises a dished shell 4, disposed in opposed relation to a stationary dished shell 5. Said shells are preferably jointly substantially spherical to receive an inflated resilient bag 6, such as a toy rubber balloon, the filler tube 6a of which extends through a hole 5a formed centrally in the shell 5. While many materials may be used for the shells, it is found that plastic is among the most suitable.

Projecting radially in diametrical opposition from the rim of shell 4, and integral therewith, are an actuating finger 4a and a lever arm 4b (Fig. 3). Said finger carries on its end portion a cushioning element 7 which engages the individual spokes of the wheel, absorbing the sound and shock of such engagement. Said cushioning element preferably takes the form of a replaceable, tight-fitting rubber sleeve, as shown in Figs. 3 and 5. A groove 4c is formed transversely of the lever arm 4b for a purpose hereinafter explained.

The stationary shell 5 is formed with a lug 5b projecting radially from its rim and being transversely grooved at 5c as shown in Figs. 3 and 4. Extending terminally from and in a plane approximately normal to that of said lug is a mounting arm 5d. A suitable curvature is formed at R on said lug as a fulcrum for the lever arm 4b. A pair of guide ribs 5e formed at the rim of the shell 5 on either side of said lug, straddle the lever arm 4b and maintain the complementary relationship of the two shells. A resiliently yieldable band 8, which may be of rubber, secures the pivotal relationship of the two shells, and is confined within the grooves 4d and 5c.

Embracing the wheel fork, and mutually secured thereto by screws 9 are clamping elements 10 and 11, the latter bearing a fixed, threaded stud 11a. The stationary shell 5 is supported on the clamp 10 by an elongated connecting arm 12 having a slot 12a adjacent to each end. Said slots respectively engage the stud 11a and a screw 13 projecting through the mounting arm 5c. Wing nuts 14 secure said connecting arm in said engagement.

As best illustrated in Fig. 3, the diameter of the inflated bag is such as to create a divergent angle between said shells resisting the effort of the band 8 to force them completely together. Hence, in the proper intended operation of the invention, the rims of the shells never make contact. There is thus prevented any impact between such rims when the pivotal shell is actuated, as is now explained.

The described arrangement for attaching my invention to a bicycle affords a wide latitude of selectively adjustable positions which simplify a location of the actuating finger 4a in the rotary path of the spokes 3b. When the wheel is revolving, its spokes successively engage said finger and urge it forward, causing the shell 4 to pivot on the fulcrum R until forced out of the spoke path. Upon release from each spoke, the shell is snapped back to its initial position against the inflated bag 6 with sufficient force to create the desired sound.

Impact of the shell 4 with the inflated bag repeated with high frequency quite closely simulates the exhaust of an internal combustion motor, such simulation being much closer than can be derived from engagement of unyielding surfaces. Cushioning of the impact between the spokes 3b and finger 4a is important since otherwise the resulting clatter would detract from the desired simulation.

What I claim is:

1. A noise-making attachment for bicycles comprising a substantially spherical inflated air bag, a pair of opposed complementary dished shells jointly forming a receiver for such bag, means interconnecting the shells and urging them yieldably toward each other, while maintaining their opposed relation, means for rigidly mounting one of said shells on a bicycle frame, and a finger fixed on the other shell and having a free end disposed in the rotary path of the spokes of one of the bicycle wheels.

2. A noise-making attachment for bicycles as set forth in claim 1, said air bag having a flexible inflation tube, and said rigidly mounted shell having an orifice accommodating such tube.

3. A noise-making attachment for bicycles as set forth in claim 1, said shells being jointly substantially spherical.

4. A noise-making attachment for bicycles as set forth in claim 1, said means for mounting one of the shells on a bicycle frame, comprising a clamp applicable to a fork member of the frame, and an arm pivotally adjustable on the clamp, and means for securing the arm rigidly to the clamp in selective pivotal positions of the arm.

5. In a noise-making attachment for bicycles as set forth in claim 1, a cushioning element mounted on said finger for impact with the spokes to minimize the sound effect of such impact.

6. A noise-making attachment for bicycles, comprising a substantially spherical inflated air bag, a pair of opposed complementary dished shells jointly forming a receiver for such bag, means for rigidly mounting one of said shells on a bicycle frame, such means including a substantially radial projection from such shell, a lug rigidly outwardly projecting from the other shell and adjoining said projection, a resilient connection between said lug and projection yieldably resisting separation of the shells, and a finger fixed on said other shell and projecting in a substantially opposite relation to said lug and having a free end disposed in the rotary path of the spokes of one of the bicycle wheels.

References Cited in the file of this patent

UNITED STATES PATENTS

| | | |
|---|---|---|
| 595,334 | Paehtz | Dec. 14, 1897 |
| 2,603,035 | Countryman | July 15, 1952 |
| 2,624,156 | Meyer | Jan. 6, 1953 |
| 2,667,720 | Connell | Feb. 2, 1954 |